United States Patent
Arlaban Gabeiras et al.

(10) Patent No.: US 10,794,360 B2
(45) Date of Patent: Oct. 6, 2020

(54) METHOD OF REDUCING LOADS ACTING ON A WIND TURBINE YAW SYSTEM

(71) Applicant: ACCIONA WINDPOWER, S.A., Barasoain, Navarra (ES)

(72) Inventors: Teresa Arlaban Gabeiras, Navarra (ES); Edurne Miranda Suescun, Navarra (ES); Alberto Garcia Barace, Navarra (ES); Oscar Luquin Hermoso de Mendoza, Navarra (ES); Alfonso Ruiz Aldama, Navarra (ES); Diego Otamendi Claramunt, Navarra (ES); Alejandro Gonzalez Murua, Navarra (ES); Jose Miguel Garcia Sayes, Navarra (ES); Miguel Nunez Polo, Navarra (ES)

(73) Assignee: ACCIONA WINDPOWER, S.A., Barasoain (Navarra) (ES)

( * ) Notice: Subject to any disclaimer, the term of this patent is extended or adjusted under 35 U.S.C. 154(b) by 129 days.

(21) Appl. No.: 15/858,168

(22) Filed: Dec. 29, 2017

(65) Prior Publication Data
US 2018/0187646 A1   Jul. 5, 2018

(30) Foreign Application Priority Data

Dec. 30, 2016   (EP) ..................................... 16382675
Dec. 29, 2017   (EP) ..................................... 17382927

(51) Int. Cl.
*F03D 7/02*   (2006.01)
*F03D 7/04*   (2006.01)

(52) U.S. Cl.
CPC ........... *F03D 7/0204* (2013.01); *F03D 7/024* (2013.01); *F03D 7/0224* (2013.01); *F03D 7/043* (2013.01);
(Continued)

(58) Field of Classification Search
CPC ...... F03D 7/0204; F03D 7/0224; F03D 7/024; F03D 7/043; F05B 2260/78; F05B 2260/90; F05B 2270/321; F05B 2270/329
See application file for complete search history.

(56) References Cited

U.S. PATENT DOCUMENTS

| | | | |
|---|---|---|---|
| 7,004,724 B2 * | 2/2006 | Pierce | F03D 7/0204 415/118 |
| 7,950,901 B2 * | 5/2011 | Barbu | F03D 7/0224 415/1 |

(Continued)

FOREIGN PATENT DOCUMENTS

| | | |
|---|---|---|
| EP | 2037119 A1 | 3/2009 |
| EP | 2159415 A2 | 3/2010 |

*Primary Examiner* — Aaron R Eastman
*Assistant Examiner* — Theodore C Ribadeneyra
(74) *Attorney, Agent, or Firm* — Lathrop GPM, LLP (57) ABSTRACT

Method of reducing loads acting on a wind turbine yaw system in a wind turbine comprising a nacelle (2), a rotor which comprises at least one rotor blade (3) with a pitch control system and further comprising a yaw system that comprises the steps of detecting a yaw misalignment ($\alpha$), enabling a yaw maneuver and performing a pitch control in order to reduce a yaw moment (Mz) acting on the wind turbine once the yaw misalignment ($\alpha$) is detected and prior to enabling the yaw maneuver. Thus, when a yaw movement to reduce the yaw misalignment is commanded, the yaw moment (Mz) due to aerodynamic forces has been reduced by means of the pitch control and undesired yaw movements are prevented.

27 Claims, 6 Drawing Sheets

(52) U.S. Cl.
CPC ....... *F05B 2260/78* (2013.01); *F05B 2260/90* (2013.01); *F05B 2270/321* (2013.01); *F05B 2270/329* (2013.01); *Y02E 10/723* (2013.01)

(56) References Cited

U.S. PATENT DOCUMENTS

| | | | | |
|---|---|---|---|---|
| 8,839,656 B2* | 9/2014 | Frederiksen | ......... | F03D 7/0204 416/1 |
| 8,890,349 B1* | 11/2014 | Lynch | ...................... | H02P 9/04 290/44 |
| 9,303,626 B2* | 4/2016 | Kumar | ................ | F03D 7/0224 |
| 9,803,621 B2* | 10/2017 | Simonsen | ............. | F03D 7/0264 |
| 2004/0081551 A1* | 4/2004 | Wobben | ............... | F03D 7/0204 415/4.1 |
| 2008/0112807 A1* | 5/2008 | Uphues | ................ | F03D 7/0224 416/1 |
| 2009/0068013 A1* | 3/2009 | Birkemose | ............ | F03D 7/0204 416/31 |
| 2010/0014971 A1* | 1/2010 | Risager | ................ | F03D 7/0224 416/1 |
| 2010/0054939 A1* | 3/2010 | Hoffmann | ............. | F03D 7/0204 416/10 |
| 2011/0084485 A1* | 4/2011 | Miranda | .............. | F03D 7/0224 290/44 |
| 2011/0142624 A1* | 6/2011 | Vadari | .................. | F03D 7/0224 416/1 |
| 2012/0009062 A1* | 1/2012 | Ingram | ................ | F03D 7/0224 416/1 |
| 2012/0139248 A1* | 6/2012 | Bertolotti | ............. | F03D 7/0204 290/44 |
| 2015/0132128 A1* | 5/2015 | Zaib | ...................... | F03D 7/0224 416/1 |
| 2015/0132129 A1* | 5/2015 | Atzler | .................. | F03D 7/0224 416/1 |
| 2015/0240787 A1* | 8/2015 | Byskov | ................ | F03D 17/00 416/1 |
| 2015/0361964 A1* | 12/2015 | Daher Adegas | ........ | F03D 7/043 416/1 |
| 2015/0377213 A1* | 12/2015 | Deshpande | ........... | F03D 7/0224 290/44 |
| 2015/0377216 A1* | 12/2015 | Deshpande | ........... | F03D 7/0224 416/1 |
| 2016/0053745 A1* | 2/2016 | Blom | ..................... | F03D 7/045 416/1 |
| 2016/0252075 A1* | 9/2016 | Kruger | ................ | F03D 7/0292 416/1 |
| 2016/0356266 A1* | 12/2016 | Koerber | ................ | F03D 7/044 |
| 2017/0122289 A1* | 5/2017 | Kristoffersen | ........ | F03D 7/0224 |
| 2017/0138348 A1* | 5/2017 | Bonding | ............... | F03D 7/0224 |

* cited by examiner

METHOD OF REDUCING LOADS ACTING ON A WIND TURBINE YAW SYSTEM

CROSS-REFERENCE TO RELATED APPLICATIONS

This patent application claims the benefit of and priority to EP Patent Application No. 16382675.3, filed on Dec. 30, 2016, and titled "METHOD OF REDUCING LOADS ACTING ON A WIND TURBINE YAW SYSTEM," and EP Patent Application No. 17382927.6, filed on Dec. 29, 2017, and titled "METHOD OF REDUCING LOADS ACTING ON A WIND TURBINE YAW SYSTEM." The disclosure of each of these patent applications is herein incorporated by reference in its entirety.

OBJECT OF THE INVENTION

The present invention is framed in the technical field of wind turbines. Specifically it is described a method of reducing loads acting on a wind turbine yaw system.

BACKGROUND OF THE INVENTION

Wind turbines of the state of the art comprise a tower, a nacelle mounted on top of the tower and a rotor which is rotatably attached to the nacelle. In order to maximize energy capture from the wind, wind turbines have to orient the nacelle in the wind direction so that the rotor faces the wind.

Wind turbines of the state of the art also include a pitch system which makes the blades rotate about their longitudinal axis, varying the aerodynamic forces acting on the blades, either to obtain the maximum possible power of the wind in certain meteorological conditions, or to limit the mechanical loads produced on the wind turbine. The pitch system is controlled by a pitch control system.

The yaw misalignment is the angle between the wind direction and the longitudinal direction of the nacelle. Yaw misalignment is usually measured by a wind vane or an ultrasonic anemometer mounted on top of the nacelle. In the wind turbines of the state of the art, the yaw system is in charge of aligning the nacelle in the wind direction to maximize the energy capture.

The yaw system comprises two sub-systems:
  Drive sub-system: This sub-system comprises a plurality of drives installed in the nacelle that engage with a ring gear fixed to the tower. This sub-system is responsible for rotating the nacelle around a substantially vertical axis to orient the nacelle in the wind direction.
  Retention sub-system: This sub-system normally comprises a brake disc attached to the top of the tower and a set of brake calipers installed in the nacelle and acting on the brake disc to fix the nacelle when no alignment operations are being performed.

In wind turbines of the state of the art, the nacelle is fixed by means of the retention sub-system while the yaw misalignment is within an allowable interval, that is, when the yaw misalignment is below a first yaw misalignment threshold. Once the yaw misalignment is over this threshold, a yaw maneuver is performed in order to align the nacelle to the wind direction. This yaw maneuver comprises the following steps:
  disengaging the brakes of a yaw retention sub-system,
  starting the drive units of a yaw drive sub-system,
  stopping the drive units once the nacelle is aligned to the wind direction,
  applying the brakes.

The yaw system is dimensioned to be able to drive the nacelle to and retain the nacelle in an oriented position in whatever working condition that the wind turbine is expected to have. However, under extreme environmental conditions or wind turbine conditions, the yaw moment acting on the wind turbine can reach such levels that the yaw system may have difficulties in retaining the nacelle in its position and/or driving it to the adequate position.

The yaw moment is a moment in the direction of the axis of the wind turbine tower and is usually induced by aerodynamic forces acting on the blades of the wind turbine.

This effect is nowadays becoming of higher importance as the size of the rotors is increasing in order to get more energy from the wind. Due to the bigger size of the rotors, wind turbines are more sensitive to environmental conditions and therefore, the loads that the yaw system has to bear are bigger.

DESCRIPTION OF THE INVENTION

A method of reducing loads acting on a wind turbine yaw system is described. The wind turbine comprises a nacelle, a yaw system and a rotor which in turn comprises at least one rotor blade with a pitch control system.

In the proposed method, once a yaw misalignment is detected (the yaw misalignment is not within an allowable interval, that is, the yaw misalignment is over a first yaw misalignment threshold) and, prior to starting a yaw maneuver, a blade pitch control is performed in order to reduce a yaw moment acting on the wind turbine which is the moment acting on the yaw system.

The technical effect is that, when the yaw controller commands a yaw movement to reduce the yaw misalignment, the yaw moment due to aerodynamic forces has been reduced by means of the pitch control. Thus, undesired yaw movements are prevented when the brakes are disengaged.

In an embodiment of the invention, the blade pitch control performed in order to reduce a yaw moment acting on the wind turbine is active until the yaw maneuver has finished.

In an embodiment of the invention, the pitch control is a collective pitch actuation that sets the same pitch angle for all the blades of the rotor according to a collective pitch angle set point. The new set point of the pitch angle can be calculated as the actual set point plus an increment value.

In one embodiment, the increment value of the pitch angle can take a predetermined value or a value dependent on several factors such as:
  Wind speed
  Electrical power generated by the wind turbine
  Turbulence intensity
  Yaw misalignment
  Wind direction As a result of the pitch control, a pitch angle set point higher than the actual set point is set that will usually result in a loss of energy production. Therefore, it is an important goal of the proposed method to consider not only the yaw moment reduction but also the loss of energy production. Therefore, based on a measured or estimated yaw moment, the pitch angle set point can be determined in order to reduce the initial yaw moment to a point that can be handled by the drive sub-system and at the same time, minimize the loss of energy production.

The moment acting on the yaw system before the yaw maneuver starts, can be measured by different means, among o:

Load sensors in the blade roots
Load sensors in the main shaft
Load sensors in the yaw axis If yaw moment measuring means are not available, yaw moment can be estimated from environmental or operational measurements and/or historic values, such as:
Wind speed
Wind direction
Electrical power generated by the wind turbine
Pitch angle of the blades
Inflow angle
Orography
Yaw misalignment
Yaw movements During the resource assessment analysis of the wind farm and based on historic data, the inflow angle is characterized at each wind turbine position and at each wind direction. If no inflow data is available, it can be estimated based on the orography of the wind farm.

The inflow angle, among other conditions like wind speed and yaw misalignment, influences the yaw moment acting on the wind turbine. Therefore, yaw moment can be estimated from mean historic inflow angle values and wind speed and yaw misalignment measurements at a given instant prior to a yaw maneuver. Based on this yaw moment estimation, the pitch control system establishes the pitch set point for reducing the estimated yaw moment to a point that can be handled by the drive sub-system.

If the yaw moment acting on the wind turbine is such that the retention sub-system cannot retain the nacelle in place leading to undesired yaw movements, the amount and direction of the yaw movements is used to estimate the direction and magnitude of the yaw moment acting on the wind turbine.

In an embodiment, the braking applied to the brakes of the retention subsystem is gradually reduced until the start of a yaw movement is detected at a certain remaining braking level of the brakes. Then, when the start of a yaw movement is detected, the remaining braking level of the brakes and the direction of the yaw movement are used to estimate the direction and magnitude of the yaw moment acting on the wind turbine. Additionally, the amount of the yaw movement can also be used in combination with the remaining braking level of the brakes and the direction of the yaw movement to estimate the direction and magnitude of the yaw moment acting on the wind turbine. The start of a yaw movement is detected for example, by means of nacelle vibrations measurements being above a threshold or small yaw movements.

In an embodiment of the invention, the pitch control system calculates the pitch angle set point based on the measured or estimated yaw moment.

The effect of the pitch angle on the yaw moment depends among other characteristics, on the wind speed and yaw misalignment. To account for that, in another embodiment of the invention, the pitch control system calculates the pitch angle set point based on the measured or estimated yaw moment and wind speed and yaw misalignment measurements.

By applying the pitch control prior to enabling a yaw maneuver, the loads in the yaw system are reduced so that undesired movements of the nacelle after releasing the brakes are avoided and the yaw drive sub-system is able to turn the nacelle at the desired speed.

While the collective pitch control only allows reducing the acting yaw moment, the individual pitch control allows generating the desired counteracting yaw moment.

The individual pitch angle set points can be constant values at each azimuthal position of the blades, or can be dependent on the measured or estimated yaw moments and other measurements as explained before for the case of the collective pitch actuation.

In another embodiment of the invention, the pitch angle set points of each blade are calculated based on the determined (measured or estimated) yaw moment. In this way the pitch control system can generate a moment that counteracts the moment acting on the yaw system. That is to say, the aerodynamic forces acting on the rotor generates a counter moment that compensates, at least in part, the initial yaw moment acting on the wind turbine prior to applying the pitch control.

The yaw moment estimation can have a significant error as it is calculated, among others, from historic values that consist usually of mean values for a certain situation. If the real yaw moment acting on the wind turbine is different from the estimated value, the yaw driving sub-system will not be able to turn the nacelle at the yaw speed set point.

In another embodiment of the invention, once the yaw movement has been enabled, the yaw moment estimation is recalculated using, among other factors, the difference between the yaw speed set point and the actual yaw speed. The actual yaw speed is detected, for example, with a sensor. The pitch angle set point is then recalculated based on the new yaw moment estimation.

In another embodiment, the pitch control is performed based on an error calculated between a yaw speed set point and an actual yaw speed once the yaw maneuver has been enabled. Preferably, the pitch control is an individual pitch control that sets different pitch angle set points to each blade according to its azimuthal position.

Alternatively, if the yaw drives are working at a constant speed, the yaw moment is estimated based on the power consumption needed to keep the yaw speed.

Additionally, the retention sub-system can be used to regulate the yaw speed. In this case, once the yaw maneuver has been enabled, and if the actual yaw speed is above the yaw speed set point (or in the case of the yaw drives working at a constant speed, no energy is needed to keep the yaw speed), the method comprises a step of adjusting the pressure of a brake hydraulic system according to the yaw speed.

In another embodiment of the invention, when the yaw misalignment has little or no impact on the energy production of the wind turbine, the method sets a second yaw misalignment threshold, bigger than the first yaw misalignment threshold. By doing so, the number of yaw maneuvers is reduced and therefore, the risk of undesired yaw movements is reduced.

The situations where the yaw misalignment has little or no impact on the energy production of the wind turbine take place at low wind speeds, where there is little available wind power, and at high wind speeds, when the wind turbine is operating at rated power, and therefore there is more available wind power than the power that the wind turbine can generate.

Additionally, when the yaw moment measurement or estimation is over a determined level, the method can set the second yaw misalignment threshold, bigger than the first yaw misalignment threshold in order to minimize the risk of undesired yaw movements, even though it can imply a significant loss of energy production.

In another embodiment of the invention, the method can further comprise the following steps:
comparing a wind speed value with a wind speed threshold value and, performing the pitch control in order to reduce the yaw moment acting on the wind turbine when the wind speed value is over the wind speed threshold value.

Therefore, just when the wind speed value exceeds the wind speed threshold (that indicates a wind speed level above which the wind speed conditions may be harmful for the yaw system), the pitch control will be performed and thus avoid additional energy losses in other wind speed conditions.

In an embodiment of the invention the method of reducing loads acting on a wind turbine yaw system further comprises the following steps:

comparing a signal indicative of turbulence with a turbulence threshold value; and performing the pitch control in order to reduce the yaw moment acting on the wind turbine when signal indicative of turbulence is over the turbulence threshold value.

Therefore, just when the turbulence values exceed the turbulence threshold (that indicates a turbulence level above which the wind speed conditions may be harmful for the yaw system), the pitch control will be performed and thus avoid additional energy losses in other turbulence conditions.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

Figure 8:
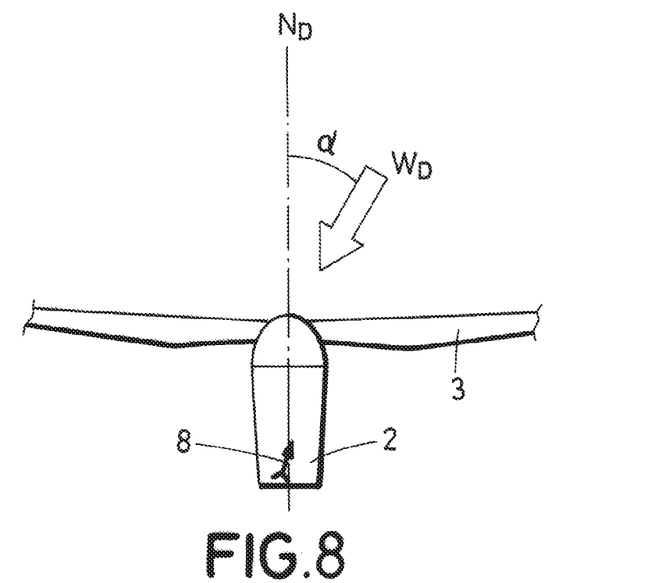
FIG. 8.—Shows the yaw misalignment ($\alpha$). The wind direction ($W_D$) and longitudinal direction of the nacelle ($N_D$) are represented.

The present invention describes a method of reducing loads acting on a wind turbine yaw system. The wind turbine comprising a nacelle (2) mounted on top of a tower (1), and a rotor, rotatably attached to the nacelle (2). The rotor further comprises three rotor blades (3). The wind turbine comprises also a wind vane (8) or an ultrasonic anemometer mounted on top of the nacelle (2) to measure a yaw misalignment ($\alpha$) (angle between the wind direction ($W_D$) and the longitudinal direction of the nacelle ($N_D$), shown in FIG. 8).

The wind turbine also comprises:

a pitch system which make the blades (3) rotate about their longitudinal axis. varying the aerodynamic forces acting on the blades (3), either to obtain the maximum possible power from the wind, or to limit the mechanical loads produced on the wind turbine.

a yaw system which is in charge of aligning the nacelle (2) in the wind direction ($W_D$) to maximize the energy capture:

a drive sub-system (partially shown in FIG. 1) responsible for rotating the nacelle (2) around a substantially vertical axis to align the nacelle (2) in the wind direction ($W_D$);

a retention sub-system (partially shown in FIG. 2) which fixes the nacelle (2) when no alignment operations are being performed.

Along the description it is used the expression "to align the nacelle (2) in the wind direction ($W_D$)" which refers to aligning the nacelle direction ($N_D$) to the wind direction ($W_D$).

Figure 1:
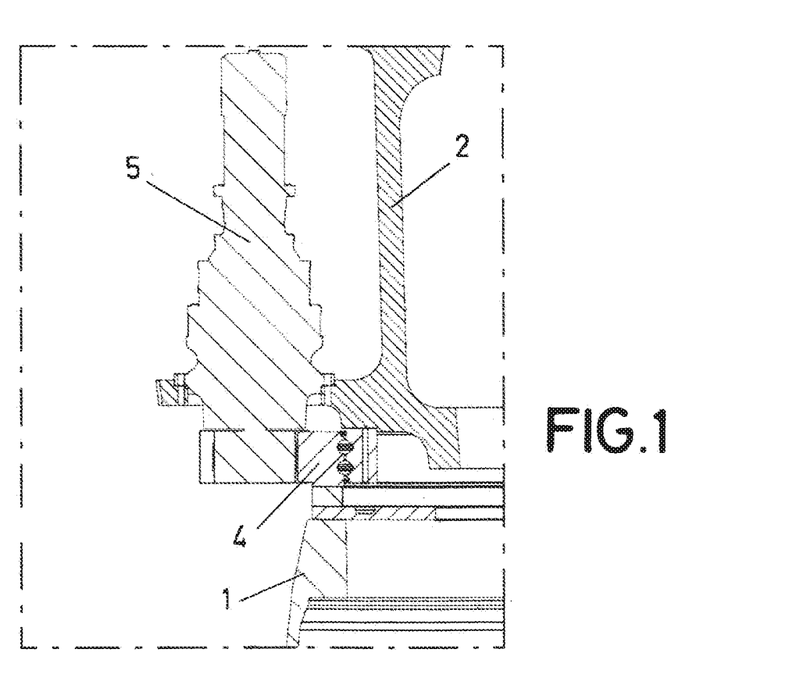
FIG. 1.—Shows part of the yaw drive sub-system.

Part of the yaw drive sub-system has been represented in FIG. 1. The figure includes a section view were the tower (1) and the nacelle (2) of the wind turbine can be appreciated. Furthermore, in the figure is shown a yaw bearing (4), which is also part of the wind turbine. The yaw drive sub-system further comprises at least a yaw drive (5).

Figure 2:
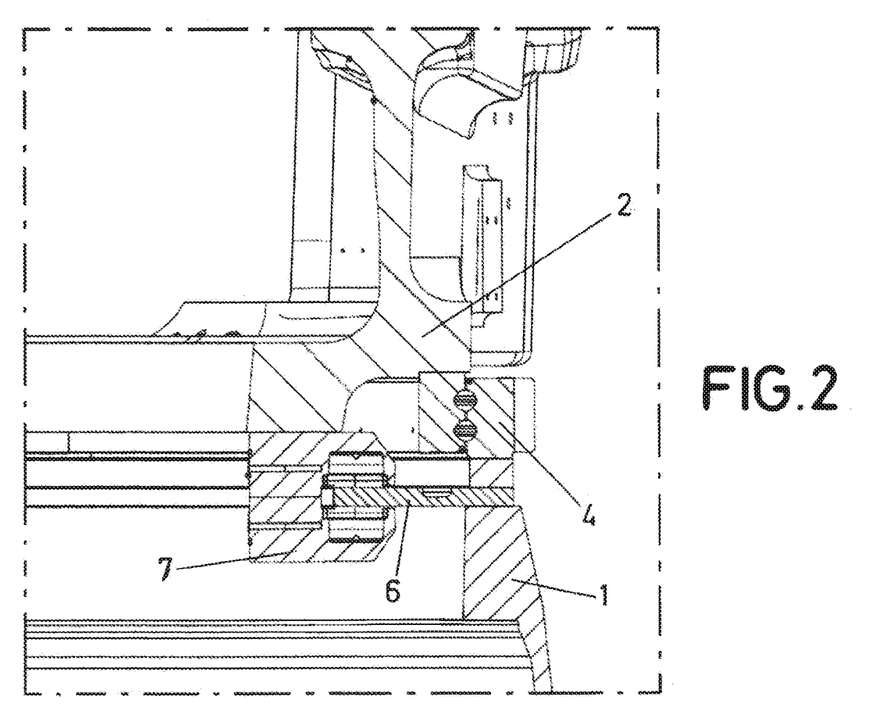
FIG. 2.—Shows part of the yaw retention sub-system.

Part of the yaw retention sub-system has been represented in FIG. 2. The figure includes a section of the tower (1), the nacelle (2) and the yaw bearing (4). In the figure, it is shown a brake disc (6) and a brake caliper (7).

The proposed method comprises at least the following steps:

detecting a yaw misalignment ($\alpha$);

performing a pitch control;

enabling a yaw maneuver.

The step of performing a pitch control is done in order to reduce a yaw moment ($M_Z$) acting on the wind turbine once the yaw misalignment ($\alpha$) is detected and prior to enabling the yaw maneuver.

The yaw maneuver comprises the steps of:

disengage the brake calipers (7) of a yaw retention sub-system, starting the drive units (5) of a yaw drive sub-system, stopping the drive units (5) once the nacelle (2) is aligned to the wind direction ($W_D$), applying the brakes calipers (7).

In a preferred embodiment of the invention, the blade pitch control performed in order to reduce a yaw moment acting on the wind turbine is active until the yaw maneuver has finished.

In an embodiment of the invention, the pitch control is performed prior to starting the drive units (5) of the yaw drive sub-system.

In an embodiment of the invention, the pitch control is performed after at least partially releasing the brakes (7) of the yaw retention sub-system, preferably at least partially disengaging the brake calipers (7) of the yaw retention sub-system.

In an embodiment of the invention, the pitch control is a collective pitch actuation that sets a new pitch angle set point that is the same pitch angle set point for all the rotor blades (3). In this case a new set point of the pitch angle can be calculated as the actual set point plus an increment value. The increment value of the pitch angle set point can be a predetermined value. Alternatively, the increment value of the pitch angle set point depends on at least one of the following:
   Wind speed
   Electrical power generated by the wind turbine (P)
   Turbulence intensity
   Yaw misalignment ($\alpha$)
   Wind direction ($W_D$)

Figure 3:
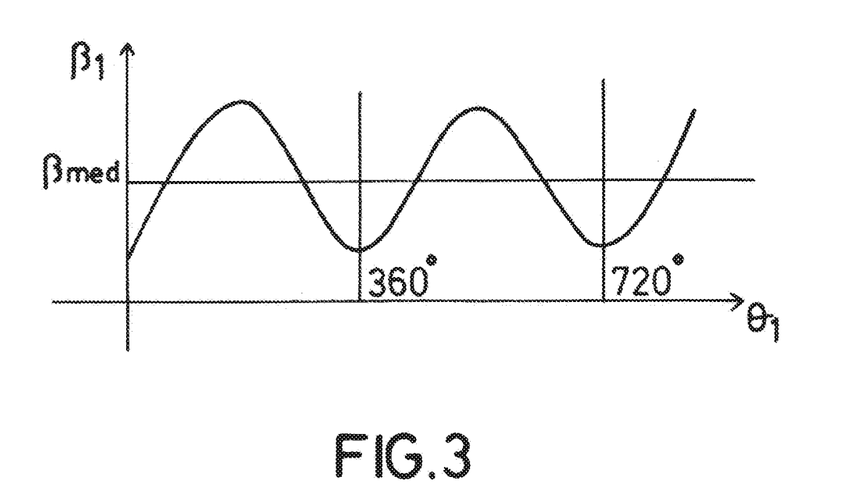
FIG. 3.—Shows an example of pitch angle set points depending on the azimuthal position ($\theta$).
Figure 4:
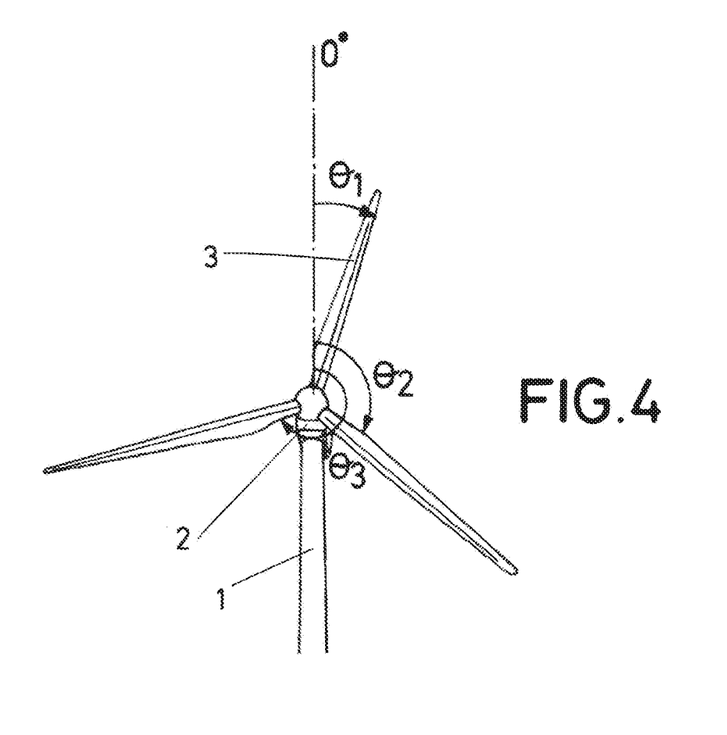
FIG. 4.—Indicates the azimuthal position ($\theta$) of the blades.

Preferably, the pitch control is an individual pitch control that sets different pitch angle set points ($\beta_1$, $\beta_2$, $\beta_3$) to each blade (3) according to its azimuthal position ($\theta_1$, $\theta_2$, $\theta_3$). The pitch angle set points ($\beta_1$, $\beta_2$, $\beta_3$) of each blade (3) can be predetermined values according to its azimuthal position ($\theta_1$, $\theta_2$, $\theta_3$), as represented in FIG. 3. Also, in FIG. 4 can be appreciated the azimuthal positions ($\theta_1$, $\theta_2$, $\theta_3$) of the blades (3). Preferably, the pitch angle set points ($\beta_1$, $\beta_2$, $\beta_3$) of each blade (3) are values according to its azimuthal position ($\theta_1$, $\theta_2$, $\theta_3$) that depend on at least one of the following:
   Wind speed
   Electrical power generated by the wind turbine (P)
   Turbulence intensity
   Yaw misalignment ($\alpha$)
   Wind direction ($W_D$)

In the preferred embodiment of the invention, the method further comprises a step of determining a yaw moment ($M_Z$) acting on the wind turbine.

Figure 6:
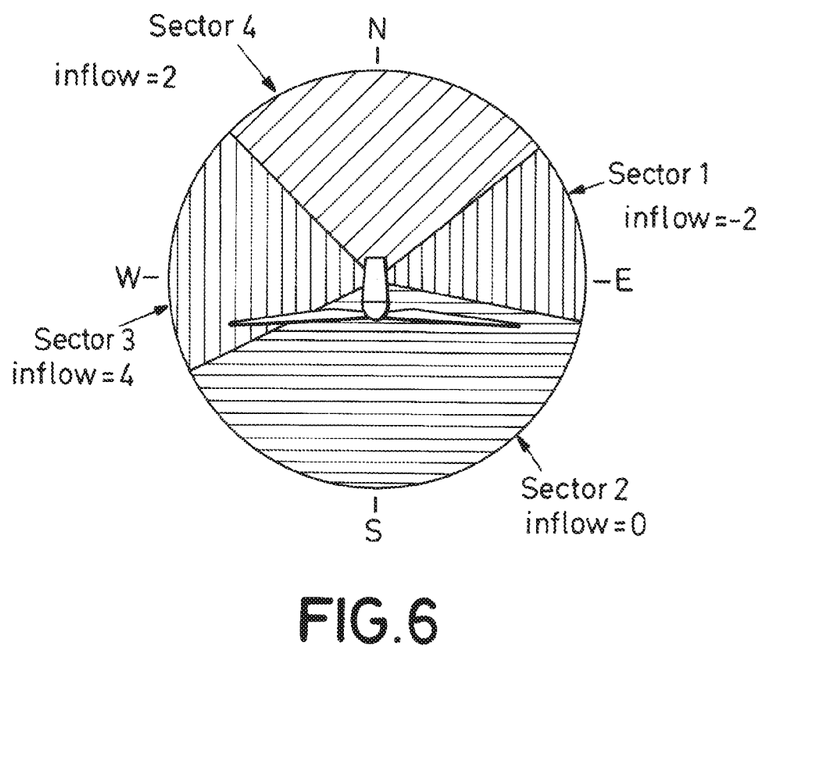
FIG. 6.—Illustrates different average inflow values at different wind direction sectors calculated during the assessment phase of the site.

The yaw moment ($M_Z$) acting on the wind turbine can be measured by load sensors. Alternatively, the yaw moment ($M_Z$) acting on the wind turbine can be estimated from at least one of:
   Wind speed
   Wind direction ($W_D$)
   Electrical power generated by the wind turbine (P)
   Pitch angle of the blades
   Inflow angle
   Orography
   Yaw misalignment ($\alpha$)
   Yaw movements Regarding the inflow angle, FIG. 6 shows different average inflow values at different wind direction sectors calculated during the assessment phase of the site. If no inflow measurements at the wind turbine site are available, these average inflow values are used for the yaw moment (Mz) estimation.

In the preferred embodiment, the pitch control is an individual pitch control that sets different pitch angle set points to each blade (3) according to its azimuthal position ($\theta_1$, $\theta_2$, $\theta_3$). The pitch angle set points of each blade (3) are calculated based on the determined (measured or estimated) yaw moment ($M_Z$), so that the aerodynamic forces acting on the rotor generates a counter moment that compensates, at least partially, the initial yaw moment ($M_Z$) acting on the wind turbine prior to applying the pitch control.

In addition, once the yaw maneuver has been enabled, the pitch angle set points ($\beta_1$, $\beta_2$, $\beta_3$) of each blade (3) are recalculated using, among other factors, the difference between a yaw speed set point ($\dot{\varphi}_{ref}$) and an actual yaw speed ($\dot{\varphi}$). The actual yaw speed ($\dot{\varphi}$) is detected, for example, with a sensor.

The first step of the method, which is detecting a yaw misalignment ($\alpha$), further comprises the following sub-steps:
   determine the yaw misalignment ($\alpha$) by means of the nacelle wind vane (8) or ultrasonic anemometer;
   comparing a yaw misalignment ($\alpha$) with a first yaw misalignment threshold ($\alpha_1$).

A yaw misalignment ($\alpha$) is detected when the angle between the wind direction ($W_D$) and the nacelle direction ($N_D$) is not within an allowable interval, that is, the yaw misalignment ($\alpha$) is over the first yaw misalignment threshold ($\alpha_1$).

When a yaw misalignment ($\alpha$) is detected which is over the first yaw misalignment threshold ($\alpha_1$), the method further comprises the step of comparing the determined (measured or estimated) yaw moment ($M_Z$) with a yaw moment threshold.

Figure 7:
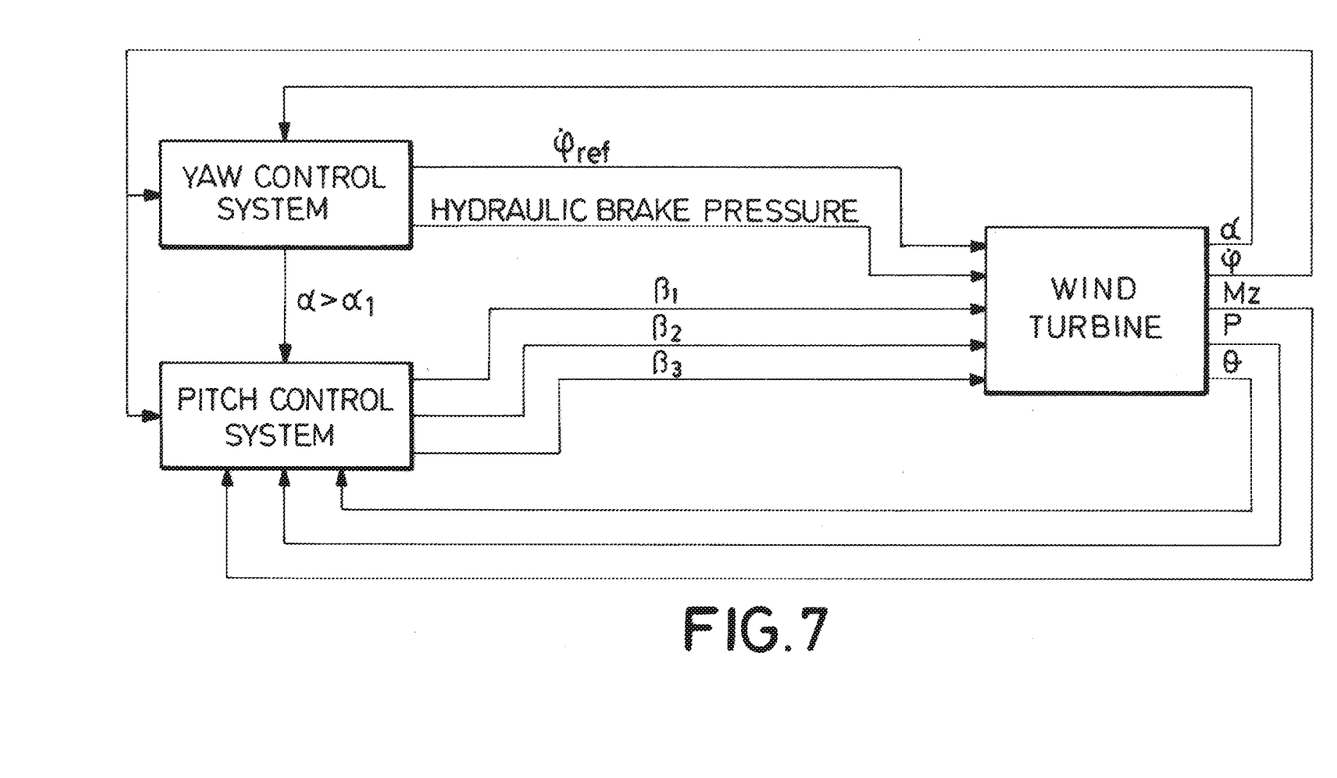
FIG. 7.—Shows a block diagram of an embodiment of the method of the invention.

As shown in FIG. 7, when the yaw control system detects a yaw misalignment ($\alpha$) above a first yaw misalignment threshold ($\alpha 1$) and prior to enabling a yaw maneuver, sends a signal to the pitch control system. The pitch control system receives measurements of the electrical power being generated by the wind turbine (P) and the yaw moment (Mz) acting on the wind turbine (for example from load sensors located on the main shat). Based on the these measurements, the pitch control system set pitch angle set points ($\beta_1$, $\beta_2$, $\beta_3$) for each blade (3) according the rotor azimuthal position ($\theta$). Once the yaw moment (Mz) has been reduced to a certain level, the yaw control system enables the yaw maneuver sending the hydraulic brake pressure set point to the yaw retention subsystem and the yaw speed set point to the yaw drive subsystem.

As explained before, the yaw moment ($M_Z$) is mainly due to aerodynamic forces acting on the wind turbine. If the estimated yaw moment ($M_Z$) is below a yaw moment threshold, the yaw system of the wind turbine can align the nacelle (2) (i.e. enable the yaw maneuver) without performing the pitch control. If the determined yaw moment ($M_Z$) is over the yaw moment threshold, the method of the invention performs a pitch control in order to reduce the yaw moment ($M_Z$) acting on the wind turbine once the yaw misalignment ($\alpha$) is detected and prior to enabling the yaw maneuver.

Once the yaw maneuver is finished, the method of the invention further comprises the step of disabling the pitch control that reduces the moment acting on the wind turbine.

In the preferred embodiment of the invention, once the yaw maneuver has been enabled, the yaw moment ($M_Z$) estimation is recalculated using, among other factors, the difference between the yaw speed set point ($\dot{\varphi}_{ref}$) and the actual yaw speed ($\dot{\varphi}$). The actual yaw speed ($\dot{\varphi}$) is detected, for example, with a sensor.

Alternatively, once the yaw maneuver has been enabled, if the yaw drives are working at a constant speed, the yaw moment ($M_Z$) is estimated based on the power consumption needed to keep the yaw speed ($\dot{\varphi}$). The pitch angle set point is then recalculated based on the new yaw moment ($M_Z$) estimation.

Additionally, the retention sub-system can be used to regulate the yaw speed ($\dot{\varphi}$) once the yaw maneuver has started. In this case, if the actual yaw speed ($\dot{\varphi}$) is above the yaw speed set point ($\dot{\varphi}_{ref}$) (or in the case of the yaw drives working at a constant speed, no energy is needed to keep the yaw speed ($\dot{\varphi}$)), the method comprises a step of adjusting the pressure of a brake hydraulic system (comprising the brake disc (6) and the brake caliper (7)) according to the yaw speed ($\dot{\varphi}$).

Figure 9:
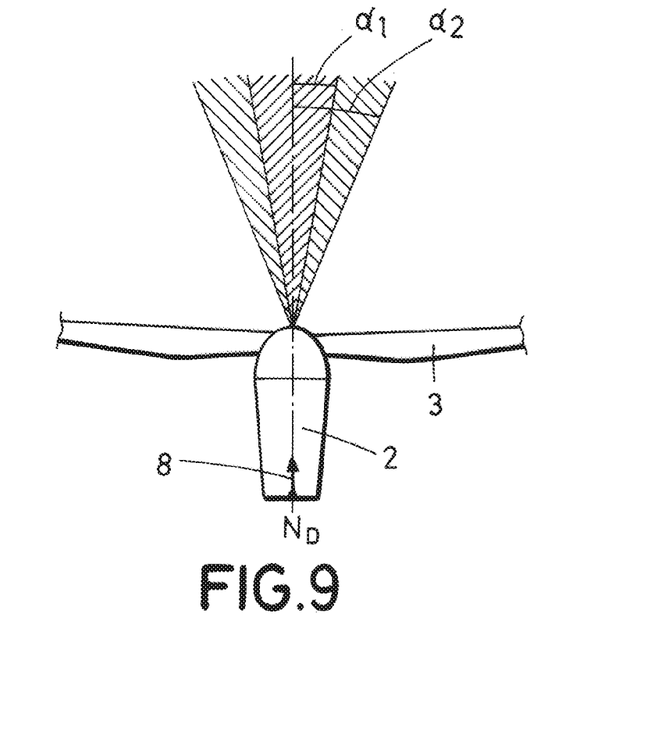
FIG. 9.—Shows the range of yaw misalignments (a) which is allowed in usual conditions. It is also represented a broader range of yaw misalignment which is tolerated under certain conditions, corresponding to the first yaw misalignment threshold ($\alpha_1$) and second yaw misalignment threshold ($\alpha_2$).

In another embodiment of the invention, when the yaw misalignment ($\alpha$) has little or no impact on the energy production of the wind turbine, the method sets a second yaw misalignment threshold ($\alpha_2$), bigger than the first yaw misalignment threshold ($\alpha_1$). By doing so, the number of yaw maneuvers is reduced and therefore, the risk of undesired yaw movements is reduced. In FIG. 9 the first yaw misalignment threshold ($\alpha_1$) and the second yaw misalignment threshold ($\alpha_2$) have been represented.

Figure 5:
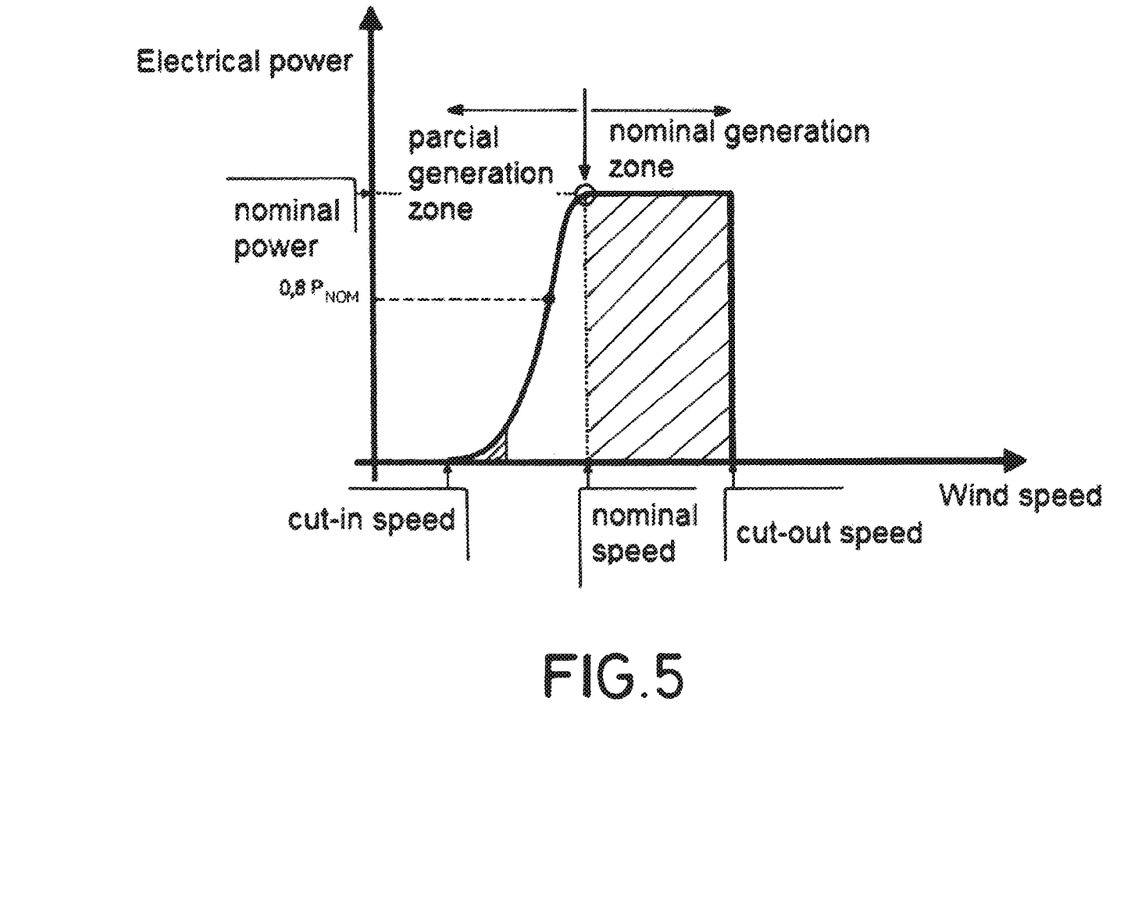
FIG. 5.—Shows the power curve of a wind turbine and the zones in which a bigger yaw misalignment ($\alpha$) can be tolerated, which are over the nominal speed and near the cut-in speed.

The situations where the yaw misalignment ($\alpha$) has little or no impact on the energy production of the wind turbine take place at low wind speeds, where there is little available wind power, and at high wind speeds, when the wind turbine is operating at rated power, and therefore there is more available wind power than the power that the wind turbine can generate. In FIG. 5 a power curve with the zones in which higher yaw misalignments can be tolerated is shown.

Additionally, when the yaw moment ($M_Z$) measurement or estimation is over a determined level, the method can set the second yaw misalignment threshold ($\alpha_2$), bigger than the first yaw misalignment threshold ($\alpha_1$) in order to minimize the risk of undesired yaw movements, even though it can imply a significant loss of generated energy.

In an embodiment of the invention, the method of reducing loads acting on a wind turbine yaw system further comprises the following steps:

comparing a wind speed value with a wind speed threshold value and, performing the pitch control in order to reduce the yaw moment ($M_Z$) acting on the wind turbine when the wind speed value is over the wind speed threshold value.

In an embodiment of the invention the method of reducing loads acting on a wind turbine yaw system further comprises the following steps:

comparing a signal indicative of turbulence with a turbulence threshold value; and performing the pitch control in order to reduce the yaw moment ($M_Z$) acting on the wind turbine when signal indicative of turbulence is over the turbulence threshold value.

The invention claimed is:

1. A method of reducing loads acting on a yaw system of a wind turbine wherein the method comprises the steps of:
   detecting a yaw misalignment,
   performing a pitch control in a pitch control system of at least one blade of a rotor acting on the wind turbine once the yaw misalignment is detected, and
   enabling a yaw maneuver, the yaw maneuver comprising starting drive units of the yaw system of the wind turbine,
   wherein the pitch control is performed prior to enabling the yaw maneuver, and wherein the pitch control comprises
   establishing a pitch set point for reducing an estimated yaw moment to a point that can be handled by the drive units of the yaw system, and
   setting a pitch angle of the at least one blade to the established set point and thereby reducing the yaw moment acting on the wind turbine and induced by aerodynamic forces acting on the at least one blade of the wind turbine.

2. The method of claim 1 wherein the pitch control is a collective pitch actuation that sets a new pitch angle set point that is the same for all the rotor blades of the at least one rotor blade.

3. The method of claim 2 wherein the new pitch angle set point is calculated as an actual pitch angle set point plus an increment value.

4. The method of claim 3 wherein the increment value of the new pitch angle set point is a predetermined value.

5. The method of claim 2 wherein the new pitch angle set point depends on at least one of the following:
   Wind speed,
   Electrical power generated by the wind turbine,
   Turbulence intensity,
   Yaw misalignment, and
   Wind direction.

6. The method of claim 1 wherein the pitch control is an individual pitch control that sets different pitch angle set points to each blade of the at least one rotor blade according to its azimuthal position.

7. The method of claim 6 wherein the pitch angle set points of each blade are predetermined values according to its azimuthal position.

8. The method of claim 6 wherein the pitch angle set points of each blade are values according to its azimuthal position that depend on at least one of the following:
   Wind speed,
   Electrical power generated by the wind turbine,
   Turbulence intensity,
   Yaw misalignment, and
   Wind direction.

9. The method of claim 6 wherein the pitch angle set points are determined in order to generate a counter moment that compensates, at least in part, the yaw moment acting on the wind turbine.

10. The method of claim 1 wherein the yaw maneuver is enabled when the yaw misalignment is over a first yaw misalignment threshold.

11. The method of claim 10 wherein the yaw maneuver is enabled when the yaw misalignment is over a second yaw misalignment threshold bigger than the first yaw misalignment threshold in conditions where the yaw misalignment is bigger than the first yaw misalignment threshold but there is not substantial impact on energy production thereof.

12. The method of claim 1 further comprising a step of determining the yaw moment acting on the wind turbine.

13. The method of claim 12 wherein the pitch control system calculates at least a pitch angle set point based on the determined yaw moment.

14. The method of claim 12 wherein the yaw moment acting on the wind turbine is estimated from at least one of:
   Wind speed,
   Wind direction,
   Electrical power generated by the wind turbine,
   Pitch angle of the blades of the at least one rotor blade,
   Inflow angle,
   Orography,
   Yaw misalignment, and
   Yaw movements.

15. The method of claim 14 further comprising the step of:
   gradually releasing brakes of a yaw retention sub-system until the start of a yaw movement is detected.

16. The method of claim 15 wherein the yaw moment acting on the wind turbine is estimated from a remaining braking level of the brakes and a direction of the yaw movements.

17. The method of claim 12 wherein the step of performing a pitch control in order to reduce a yaw moment prior to enabling the yaw maneuver is performed when the determined yaw moment is over a yaw moment threshold.

18. The method of claim 12 wherein the yaw moment is determined based on an error calculated between a predetermined yaw speed and an actual yaw speed once the yaw maneuver has been enabled.

19. The method of claim 12 wherein the yaw moment is determined based on the power consumption required to keep the yaw rotation speed once the yaw maneuver has been enabled.

20. The method of claim 1 further comprising a step of adjusting the pressure of a hydraulic brake system according to the yaw rotational speed once the yaw maneuver has been enabled.

21. The method of claim 1 wherein the yaw maneuver comprises the steps of:
   releasing brakes of a yaw retention sub-system,
   starting drive units of a yaw drive sub-system,
   stopping the drive units once the nacelle is aligned to a wind direction, and
   applying the brakes.

22. The method of claim 21 wherein the pitch control is performed after at least partially releasing brakes of the yaw retention sub-system.

23. The method of claim 1 further comprising the following steps:
   comparing a wind speed value with a wind speed threshold value and,
   performing the pitch control in order to reduce the yaw moment acting on the wind turbine when the wind speed value is over the wind speed threshold value.

24. The method of claim 1 further comprising the following steps:
   comparing a signal indicative of turbulence with a turbulence threshold value; and
   performing the pitch control in order to reduce the yaw moment acting on the wind turbine when the signal indicative of turbulence is over the turbulence threshold value.

25. The method of claim 1 wherein the pitch control performed in order to reduce a yaw moment acting on the wind turbine is active until the yaw maneuver has finished.

26. The method of claim 1 wherein the pitch control is performed based on an error calculated between a yaw speed set point and an actual yaw speed once the yaw maneuver has been enabled.

27. The method of claim 26 wherein the pitch control is an individual pitch control that sets different pitch angle set points to each blade of the at least one rotor blade according to its azimuthal position.

* * * * *